US012529129B2

(12) United States Patent
Ichie et al.

(10) Patent No.: US 12,529,129 B2

(45) Date of Patent: Jan. 20, 2026

(54) HOT-ROLLED STEEL SHEET FOR NON-ORIENTED ELECTRICAL STEEL SHEET

(71) Applicant: NIPPON STEEL CORPORATION, Tokyo (JP)

(72) Inventors: Takeru Ichie, Tokyo (JP); Yoshihiro Arita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 668 days.

(21) Appl. No.: 17/787,201

(22) PCT Filed: Feb. 19, 2021

(86) PCT No.: PCT/JP2021/006442

§ 371 (c)(1),
(2) Date: Jun. 17, 2022

(87) PCT Pub. No.: WO2021/167086

PCT Pub. Date: Aug. 26, 2021

(65) Prior Publication Data

US 2022/0380877 A1 Dec. 1, 2022

(30) Foreign Application Priority Data

Feb. 20, 2020 (JP) ................................ 2020-027503

(51) Int. Cl.

| | |
|---|---|
| ***C22C 38/60*** | (2006.01) |
| ***C21D 8/12*** | (2006.01) |
| ***C22C 38/02*** | (2006.01) |
| ***H01F 1/147*** | (2006.01) |

(52) U.S. Cl.

CPC ............ *C22C 38/60* (2013.01); *C21D 8/1222* (2013.01); *C22C 38/02* (2013.01); *H01F 1/147* (2013.01)

(58) Field of Classification Search

CPC ....... C22C 38/60; C22C 38/02; C22C 38/001; C22C 38/002; C22C 38/005; C22C 38/008; C22C 38/04; C22C 38/06; C22C 38/16; C22C 38/004; C21D 8/1222; C21D 1/18; C21D 1/60; C21D 1/02; C21D 1/84; C21D 6/008; C21D 8/0205; C21D 8/0226; C21D 8/0263; C21D 8/1233; C21D 8/1244; C21D 8/1261; C21D 8/1272; C21D 9/46; H01F 1/147; H01F 1/14775; H01F 1/16; Y02P 10/20

See application file for complete search history.

(56) References Cited

U.S. PATENT DOCUMENTS

| | | | | |
|---|---|---|---|---|
| 2013/0240094 | A1 * | 9/2013 | Akamatsu ............... | C22C 38/54 148/330 |
| 2014/0373340 | A1 | 12/2014 | Dorninger et al. | |
| 2017/0314090 | A1 | 11/2017 | Okubo et al. | |

FOREIGN PATENT DOCUMENTS

| | | | |
|---|---|---|---|
| JP | 64-225 | A | 1/1989 |
| JP | 64-227 | A | 1/1989 |
| JP | 2016211016 | A | * 12/2016 |
| JP | 2019-157247 | A | 9/2019 |
| KR | 10-2017-0072278 | A | 6/2017 |

* cited by examiner

*Primary Examiner* — Keith D. Hendricks
*Assistant Examiner* — Mayela Aldaz
(74) *Attorney, Agent, or Firm* — Birch, Stewart, Kolasch & Birch, LLP

(57) ABSTRACT

A hot-rolled steel sheet for a non-oriented electrical steel sheet containing, in mass %, components of C: 0.0010% to 0.0050%, Si: 1.90% to 3.50%, Al: 0.10% to 3.00%, Mn: 0.05% to 2.00%, P: 0.10% or less, S: 0.005% or less, N: 0.0040% or less and B: 0.0060% or less with a remainder comprising Fe and impurities, in which, in a sheet width-direction end portion of the hot-rolled steel sheet for a non-oriented electrical steel sheet, a C concentration [atom %] in a crystal grain boundary is 3.0 or more times a P concentration [atom %], and the C concentration [atom %] in the crystal grain boundary of the hot-rolled steel sheet for a non-oriented electrical steel sheet is 3.5 or more times a C concentration in a crystal grain.

5 Claims, No Drawings

HOT-ROLLED STEEL SHEET FOR NON-ORIENTED ELECTRICAL STEEL SHEET

The present invention relates to a hot-rolled steel sheet for a non-oriented electrical steel sheet having excellent magnetic characteristics that is mainly used as an iron core material for electrical equipment.

Priority is claimed on Japanese Patent Application No. 2020-027503, filed in Japan on Feb. 20, 2020, the content of which is incorporated herein by reference.

BACKGROUND ART

Recently, in the field of electrical equipment, particularly, rotating machinery, small and medium-sized transformers, electrical components and the like in which a non-oriented electrical steel sheet is used as an iron core material, in response to the movement for global environmental conservation represented by global power and energy savings, $CO_2$ reduction and the like, a demand for high efficiency and size reduction has grown more intense. Under such a social environment, naturally, improvement in the performance of non-oriented electrical steel sheets is an urgent problem.

Characteristics that are required for non-oriented electrical steel sheets regarding improvement in the characteristics of motors are an iron loss and a magnetic flux density. In the related art, grain diameters before cold rolling are increased by coiling at high temperatures after hot rolling, whereby the textures of non-oriented electrical steel sheets, which are products, are controlled and the characteristics thereof are improved.

Patent Document 1 describes that a non-oriented electrical steel sheet capable of obtaining excellent magnetic characteristics in all directions in the sheet plane is obtained by controlling the columnar crystal rate and the average crystal grain diameter in the casting or rapid solidification of molten steel, controlling the rolling reduction of cold rolling and controlling the threading tension and the cooling rate during final annealing.

CITATION LIST

Patent Document

Patent Document 1: Japanese Unexamined Patent Application, First Publication No. 2019-157247

SUMMARY OF INVENTION

Technical Problem

As the demand of non-oriented electrical steel sheets (hereinafter, also simply referred to as electrical steel sheets) intensifies, cost reduction is also demanded. As one of methods for reducing manufacturing costs, a method in which annealing after hot rolling is skipped by increasing the hot rolling temperature in a hot rolling process is conceivable. However, compared with normal steel sheets, a large amount of Si is added to electrical steel sheets to decrease the iron loss, which causes the initiation of cracks from the end portions of the steel sheets and the fracturing of the steel sheets in a pickling process after hot rolling accompanying bending and unbending in a continuous line. Simple skipping of annealing after hot rolling degrades the toughness and increases the risk of the fracturing of steel sheets.

The present invention has been made in consideration of the above-described circumstances, and an objective of the present invention is to provide a hot-rolled steel sheet for a non-oriented electrical steel sheet in which, even when annealing after hot rolling is skipped, fracturing due to bending and unbending in the subsequent pickling process can be suppressed, furthermore, the magnetic characteristics are excellent in a case where an electrical steel sheet is produced, and the toughness improves.

Solution to Problem

The present inventors repeated intensive studies regarding a method for, in a hot-rolled sheet for a non-oriented electrical steel sheet, skipping annealing in a hot rolling process and satisfying both hot-rolled sheet toughness high enough to suppress the occurrence of fracturing of the steel sheet end portion during pickling and magnetic characteristics of the electrical steel sheet.

As a result, it was found that, when the soaking temperature and time during the self-annealing of the hot-rolled sheet by high-temperature coiling after hot rolling and the cooling rate in the subsequent cooling are controlled, it is possible to increase the segregation amount of C that is present in grain boundaries in the sheet width-direction end portion of a hot-rolled steel sheet with respect to the segregation amount of P, which degrades toughness, as a result, fracturing due to bending and unbending can be prevented by improving the toughness of the hot-rolled steel sheet, and excellent magnetic characteristics can be realized when a non-oriented electrical steel sheet is produced.

The present invention has been made on the basis of the above-described finding, and the gist thereof is as described below.

(1) A hot-rolled steel sheet for a non-oriented electrical steel sheet containing, in mass %, C: 0.0010% to 0.0050%, Si: 1.90% to 3.50%, Al: 0.10% to 3.00%, Mn: 0.05% to 2.00%, P: 0.10% or less, S: 0.005% or less, N: 0.0040% or less, B: 0.0060% or less, Sn: 0% to 0.50%, Sb: 0% to 0.50%, Cu: 0% to 0.50%, REM: 0% to 0.0400%, Ca: 0% to 0.0400%, Mg: 0% to 0.0400%, and a remainder comprising Fe and impurities, in which, in a sheet width-direction end portion of the hot-rolled steel sheet for a non-oriented electrical steel sheet, a C concentration [atom %] in a crystal grain boundary is 3.0 or more times a P concentration [atom %], and the C concentration [atom %] in the crystal grain boundary is 3.5 or more times a C concentration in a crystal grain.

(2) The hot-rolled steel sheet for a non-oriented electrical steel sheet according to (1), containing, in mass %, one or two or more of Sn: 0.01% or more and 0.50% or less, Sb: 0.01% or more and 0.50% or less, Cu: 0.01% or more and 0.50% or less, REM: 0.0005% or more and 0.0400% or less, Ca: 0.0005% or more and 0.0400% or less and Mg: 0.0005% or more and 0.0400% or less.

Advantageous Effects of Invention

According to the present invention, it is possible to provide a hot-rolled steel sheet for a non-oriented electrical steel sheet having sufficient hot-rolled sheet toughness even in the case of skipping annealing in a hot rolling process and satisfying both a low iron loss and a high magnetic flux density when a non-oriented electrical steel sheet is produced.

Embodiment for Implementing Invention

Hereinafter, a preferable embodiment of the present invention will be described in detail. However, the present invention is not limited only to a configuration disclosed in the present embodiment and can be modified in a variety of manners within the scope of the gist of the present invention. In the following description, there will be cases where specific numerical values or materials are exemplified, but other numerical values or materials may also be applied as long as the effect of the present invention can be obtained. In addition, individual configuration elements of the embodiment to be described below can be combined with each other. In addition, the numerical limiting ranges to be described below include the lower limit value and the upper limit value in the ranges. Numerical values expressed with ‘more than’ or ‘less than’ are not included in numerical ranges.

[Chemical Components of Hot-Rolled Steel Sheet for Non-Oriented Electrical Steel Sheet]

First, the reasons for limiting steel components of the present invention will be described. Hereinafter, “%” regarding the components of the steel sheet means “mass %”.

C: 0.0010% to 0.0050%

C is segregated in grain boundaries to strengthen the toughness, and thus 0.0010% or more of C is preferably added. On the other hand, C is a harmful component that degrades the iron loss and also acts as a cause for magnetic aging, and thus the C content is set to 0.0050% or less and preferably set to 0.0040% or less.

Si: 1.90% to 3.50%

Si is a component having an action of reducing the iron loss by increasing the electrical resistance to decrease the eddy current loss and also has an action of improving blankability into iron cores by increasing the yield ratio. In order to exhibit these actions, 1.90% or more of Si needs to be contained. On the other hand, when the content thereof increases, the magnetic flux density decreases, and, in the manufacturing processes of a non-oriented electrical steel sheet, the workability for cold rolling and the like deteriorates, and the cost increases, and thus the Si content is set to 3.50% or less and preferably set to 3.00% or less.

Al: 0.10% to 3.00%

Al is also, similar to Si, a component having an action of reducing the iron loss by increasing the electrical resistance to decrease the eddy current loss, but increases the hardness to a small extent compared with Si. Therefore, 0.10% or more of Al needs to be contained. On the other hand, when the content thereof increases, the saturated magnetic flux density decreases, a decrease in the magnetic flux density is caused, furthermore, a decrease in the yield ratio is caused, and the blanking accuracy is also degraded, and thus the Al content is set to 3.00% or less and preferably set to 2.50% or less.

Mn: 0.05% to 2.00%

Mn has effects of increasing the electrical resistance to reduce the eddy current loss and improving the primary recrystallization texture to develop a {110}<001> crystal orientation, which is desirable for improvement in the magnetic characteristics in a rolling direction. Furthermore, Mn suppresses the precipitation of a fine sulfide such as MnS, which is harmful to crystal grain growth. In order for such purposes, 0.05% or more, preferably, 0.20% or more of Mn needs to be contained. However, when the content thereof increases, the crystal grain growth during annealing deteriorates, and the iron loss increases, and thus the Mn content is set to 2.00% or less and preferably set to 1.50% or less.

P: 0.10% or Less

P has an effect of increasing the blanking accuracy and may be added, but an increase in the P content makes steel sheets containing more than 2% of Si extremely brittle. Therefore, the P content is set to 0.10% or less and preferably set to 0.05% or less. The lower limit of the P content is not particularly limited, but is preferably set to 0.005% or more from the viewpoint of the deterioration of the magnetic flux density by reduction of P.

S: 0.005% or Less

S is finely precipitated as a sulfide such as MnS and thereby impairs recrystallization and crystal grain growth during final annealing or the like, and thus the S content is set to 0.005% or less and preferably set to 0.004% or less. The lower limit of the S content is not particularly limited, but is preferably set to 0.0005% or more from the viewpoint of an increase in the costs by desulfurization.

N: 0.0040% or Less

N decreases the coating rate of an internal oxide layer on the surface of the hot-rolled sheet by the fine precipitation of a nitride such as AlN, which is formed during hot-band annealing or final annealing, and, furthermore, impairs recrystallization and crystal grain growth during final annealing or the like, and thus the N content is set to 0.0040% or less and preferably set to 0.0030% or less. The lower limit of the N content is not particularly limited, but is preferably set to 0.0005% or more from the viewpoint of an increase in the costs for reducing N.

B: 0.0060% or Less

B impairs recrystallization and crystal grain growth during final annealing or the like due to the fine precipitation of a nitride such as BN, and thus the B content is set to 0.0060% or less and preferably set to 0.0040% or less. The lower limit of the B content is not particularly limited, but is preferably set to 0.00010% or more from the viewpoint of an increase in the costs for reducing B.

Sn: 0% to 0.50%

Sb: 0% to 0.50%

Sn and Sb are not essential elements, but have an effect of improving the primary recrystallization texture of the steel sheet to develop the texture into the {110}<001> texture, which is desirable for improvement in the magnetic characteristics in the rolling direction, and suppressing a {111}<112> texture or the like, which is not desirable for the magnetic characteristics, and thus may be added as necessary. In order for such purposes, 0.01% or more of each of Sn and Sb is preferably contained. On the other hand, even when the contents thereof increase, the above-described actions are saturated, and conversely, there are cases where the toughness of the hot-rolled sheet is degraded, and thus, even in a case where Sn and Sb are contained, the Sn and Sb contents are each set to 0.50% or less.

Cu: 0% to 0.50%

Cu is not an essential element, but exhibits an action of being precipitated in steel to improve the strength and thus may be added as necessary. In order to obtain this action, 0.01% or more of Cu is preferably contained. On the other hand, when more than 0.50% of Cu is contained, there are cases where cracks and defects are initiated during rolling. Therefore, the Cu content is preferably 0.01% to 0.50%. Even when Sn, Sb or Cu is contained as an impurity, the effects of the above-described basic elements are not impaired.

REM: 0% to 0.0400% or Less

Ca: 0% to 0.0400% or Less

Mg: 0% to 0.0400% or Less

REM, Ca and Mg are not essential elements, but are elements that accelerate grain growth and thus may be added as necessary. In order to obtain this effect, the content of each is preferably set to 0.0005% or more. The content of any of the elements is preferably 0.0010% or more and more preferably 0.0050% or more. On the other hand, when the content of each of REM, Ca and Mg exceeds 0.0400%, the magnetic characteristics deteriorate, and thus the content is set to 0.0040% or less. The content of any of the elements is preferably 0.0300% or less and more preferably 0.0200% or less. REM is an abbreviation for rare earth metal and refers to Sc, Y and elements belonging to the lanthanoid series. Industrially, lanthanoids are added in a mischmetal form.

Components other than the above-described components are Fe and impurity elements.

When the hot-rolled steel sheet for a non-oriented electrical steel sheet is caused to contain components as described above, it is possible to produce a non-oriented electrical steel sheet having excellent magnetic characteristics when the electrical steel sheet is produced.

The above-described steel components may be measured by an ordinary analysis method of steel. For example, the steel components may be measured using inductively coupled plasma-atomic emission spectrometry (ICP-AES). C and S may be measured using an infrared absorption method after combustion, and N may be measured using an inert gas melting-thermal conductivity method.

[Grain Boundary Element Concentrations of Hot-Rolled Steel Sheet for a Non-Oriented Electrical Steel Sheet]

Next, the element concentrations in grain boundaries of the hot-rolled steel sheet for a non-oriented electrical steel sheet will be described.

<C Concentration/P Concentration>

Next, in the hot-rolled steel sheet for a non-oriented electrical steel sheet of the present embodiment, the ratio TR=C/P of the C concentration (C) to the P concentration (P) [atom %] that are contained in the grain boundaries is 3.0 or more. P is a representative element that decreases the cohesive force between atoms and degrades the toughness by being segregated in the grain boundaries. Therefore, the amount of P segregated in the grain boundaries is preferably as small as possible, but it is normal for P to be inevitably contained in the steel sheet as an impurity element, and thus it is difficult to avoid the degradation of the toughness by the intergranular segregation of P. The fact that the ratio TR=C/P of the C concentration (C) to the P concentration (P) [atom %] that are contained in the grain boundaries of the hot-rolled steel sheet for a non-oriented electrical steel sheet is 3.0 or more means that, in other words, the C concentration [atom %] in the crystal grain boundaries is 3.0 or more times the P concentration [atom %].

C is a representative element that improves the cohesive force between atoms and improves the toughness by being segregated in the grain boundaries. Therefore, in the hot-rolled steel sheet for a non-oriented electrical steel sheet of the present invention, the C concentration that is segregated in the grain boundaries is set to be 3.0 or more times the P concentration that is segregated in the grain boundaries. In such a case, the toughness of the hot-rolled steel sheet improves, and it is possible to prevent the fracturing of the end portion of the steel sheet due to bending and unbending in a pickling process.

In a case where the steel sheet fractures due to bending and unbending, cracks are initiated in the end portion, and the steel sheet fractures, and thus the C concentration and the P concentration that are contained in the grain boundaries in the end portion of the steel sheet need to have the above-described relationship. Specifically, the C concentration and the P concentration that are contained in the grain boundaries are measured by cutting a Charpy test piece such that a position 10 mm from the sheet width-direction end face of the steel sheet (hereinafter, referred to as the sheet width-direction end portion) becomes the surface of an L cross section, making a notch on the surface on the steel sheet side surface, carrying out a Charpy test in an atmosphere of −50° C. or lower and analyzing the intergranular fractured surface by Auger electron spectroscopy (AES). The C concentration and the P concentration are calculated from the ratios between the spectrum intensity of the intergranular fractured surface analyzed by AES and the spectrum intensities of the amount of existing elements. Here, the L cross section means a cross section parallel to the sheet thickness direction of the steel sheet and a rolling direction (or the longitudinal direction of the steel sheet).

B also has the same effect as C, but B is an element that degrades the magnetic characteristics and thus makes it difficult to satisfy both the magnetic characteristics and the toughness, and, as described above, B impairs recrystallization and crystal grain growth during final annealing or the like due to the fine precipitation of a nitride, and thus, in the present invention, C is segregated in the grain boundaries.

<Grain Boundary C Concentration/Intragranular C Concentration>

In addition to the above-described ratio of the C concentration to the P concentration in the grain boundaries, furthermore, the ratio $CR=C_{GB}/C_{IG}$ of the C concentration ($C_{GB}$)[atom %] present in the grain boundaries of the hot-rolled steel sheet for a non-oriented electrical steel sheet to the C concentration ($C_{IG}$) [atom %] present in the grains is set to 3.5 or more, whereby it is possible to further improve the toughness. The grain boundary C concentration and the intragranular C concentration can be measured by the same method as for the above-described C concentration and P concentration. The fact that the ratio $CR=C_{GB}/C_{IG}$ of the C concentration ($C_{GB}$) [atom %] present in the grain boundaries of the hot-rolled steel sheet for a non-oriented electrical steel sheet to the C concentration ($C_{IG}$) [atom %] present in the grains is set to 3.5 or more means that, in other words, the C concentration [atom %] in the crystal grain boundaries of the hot-rolled steel sheet for a non-oriented electrical steel sheet is 3.5 or more times the C concentration in the crystal grains.

[Manufacturing Method]

Next, a manufacturing method of the hot-rolled steel sheet for a non-oriented electrical steel sheet of the present embodiment will be described.

The hot-rolled steel sheet for a non-oriented electrical steel sheet of the present invention is manufactured by making molten steel having the above-described components into a slab by continuous casting, furthermore, carrying out hot rolling to produce a hot-rolled sheet (hot rolling process), carrying out self-annealing with heat from a coil coiled after the hot rolling and, furthermore, cooling the coil. As the method for manufacturing the slab, a normal method may be used.

<Hot Rolling>

Next, the slab is preferably heated to 1080° C. to 1200° C. and hot-rolled. The heating temperature is preferably set to 1080° C. or higher since the finishing temperature becomes 850° C. or higher, and annealing by reheating after coiling is skipped as described below. The finishing temperature is preferably set to 1200° C. or lower since the formation of a solid solution and fine precipitation of an impurity such as a sulfide are prevented, and the iron loss is not increased.

The finishing temperature is preferably set to 850° C. to 1000° C. This is because, as described below, the coiling temperature is set to 700° C. to 800° C. to carry out self-annealing with heat from a coil, thereby skipping annealing by reheating. In addition, this is because, when the finishing temperature is low, the hot workability deteriorates, and there is a concern that the sheet thickness accuracy in the steel sheet width direction may deteriorate. On the other hand, in order to prevent the deterioration of the toughness due to the coarsening of ferrite grain diameters, the finishing temperature is preferably set to 1000° C. or lower.

<Coiling and Self-Annealing>

Next, the hot-rolled steel sheet after the end of finish rolling is coiled at 700° C. to 850° C. When the hot-rolled steel sheet is coiled at 700° C. to 850° C., it becomes possible to carry out self-annealing with heat accumulated by the coiled coil, and it becomes possible to suppress the development of crystal grains in a {111} orientation, which adversely affect the magnetic characteristics, even when annealing by reheating is skipped. In order to improve the magnetic characteristics, particularly, the magnetic flux density, it is preferable to further coarsen the crystal grain diameters of the hot-rolled steel sheet before cold rolling; however, when the hot-rolled steel sheet is annealed at high temperatures, the toughness deteriorates due to decarburization, and a toughness improvement effect cannot be obtained, and thus the coiling temperature is preferably set to 850° C. or lower.

The process of carrying out self-annealing on the coil after coiling is also referred to as a heat conservation treatment process. The heat conservation treatment process begins at a point in time where the hot-rolled steel sheet is coiled to form the coil and ends at a point in time where the temperature of the coil begins to decrease. The point in time where the coil is formed is a point in time where the coiling of a single strip of the hot-rolled steel sheet into a single turn of a coil is completed. In addition, the point in time where the temperature of the coil begins to decrease is a point in time where the cooling rate of the coil changes, in other words, the inflection point of the cooling rate curve. Depending on the heat conservation temperature, there are cases where a change in the temperature of the coil is extremely small for a predetermined period of time from the point in time where the coiling of the coil is completed, and, once the predetermined period of time elapses, the temperature of the coil begins to rapidly decrease.

In addition, in order to coarsen the crystal grain diameters of the hot-rolled steel sheet before cold rolling, heat may be retained by covering the coiled coil with a heat conservation cover. In the case of carrying out the heat conservation treatment process using the heat conservation cover, the time from putting the heat conservation cover on the coil to removing it is regarded as the heat conservation time. From the viewpoint of the recrystallization of the hot-rolled sheet, the heat conservation time of heat conservation is preferably one minute or longer. On the other hand, when grains are excessively grown, fracturing is likely to occur in the pickling process and a cooling process, and thus the heat conservation time is preferably two hours or shorter.

The process of retaining heat by covering the coil with the heat conservation cover or the process of carrying out self-annealing with heat accumulated by the coiled coil is also referred to as the heat conservation treatment process.

The temperature of the heat conservation treatment process is preferably 720° C. to 830° C. When the temperature of the heat conservation treatment process is set to 720° C. or higher, the grain diameters before cold rolling sufficiently grow, and a high magnetic flux density can be obtained. In addition, when the temperature of the heat conservation treatment process is set to 830° C. or lower, the effect on an internal oxide layer that is formed on the surface of the steel sheet being suppressed can be obtained.

<Cooling>

In the present invention, it is important to control the cooling rate so that the C concentration and the P concentration in the grain boundaries have the above-described relationship.

Specifically, when the cooling rate in a temperature range from the coiling temperature to 600° C., which is a temperature at which P is likely to be segregated in the grain boundaries, is set to be fast, the segregation of P is suppressed, and, when the cooling rate in a temperature range of 400° C. to 600° C., which are temperatures at which C is likely to be segregated in the grain boundaries, is set to be slow, the segregation of C is accelerated. In such a case, the deterioration of the toughness due to the grain boundary segregation of P is suppressed, which makes it possible to prevent the fracturing of the steel sheet in the next processes. The process of controlling the cooling rate in a temperature range from the coiling temperature to 400° C. is also referred to as the cooling process.

The average cooling rate from the coiling temperature to 600° C. is preferably set to 10 to 100° C./min. The average cooling rate from the coiling temperature to 600° C. is more preferably faster than 10° C./min and still more preferably 20° C./min, 30° C./min or 40° C./min.

The average cooling rate at 400° C. to 600° C. is preferably as slow as possible in order to accelerate the segregation of C into the grain boundaries; however, when the average cooling rate is too slow, the time of the self-annealing becomes long, and the grain diameters coarsen excessively and thereby degrading the toughness, and thus the average cooling rate is preferably set to 30° C./hr or faster. When the cooling rate is too fast, C is not sufficiently segregated, and thus the cooling rate is preferably set to 120° C./hr or slower.

As described, cracks are initiated and the steel sheet fractures in the end portion of the steel sheet, and thus the above-described cooling rate is the cooling rate in the end portion (the side surface side of the coil) of the steel sheet. The cooling rate can be controlled by sending an air to the coil with a blower and adjusting the amount or temperature of the air. As the temperature of the end portion of the steel sheet, the temperature of the steel sheet cross section (at a desirable site) is measured with a radiation thermometer. The time during which the air is sprayed to the coil with the blower is regarded as the cooling time. The cooling time is not particularly designated.

Furthermore, when the cooling rate at 400° C. to 600° C. is set to 50 to 80° C./hr, it is possible to set the ratio $CR=C_{GB}/C_{IG}$ of the C concentration ($C_{GB}$) [atom %] present in the grain boundaries of the hot-rolled steel sheet for a non-oriented electrical steel sheet to the C concentration ($C_{IG}$) [atom %] present in the grains to 3.5 or more.

In detail, the cooling rate is controlled by spraying an air to the coil that has undergone self-annealing (heat conservation treatment process) with, for example, a blower to cool the coil.

The cooling is more preferably initiated immediately after the above-described cover is removed. Alternatively, the cooling is more preferably initiated before the point in time where the temperature of the coil begins to decrease.

<Sn and Sb>

In a case where Sn and Sb are added to the steel sheet, since these elements contribute to a low iron loss and a high magnetic flux density, it is possible to decrease the heat conservation temperature, and, consequently, the toughness can be improved. At this time, when the heat conservation temperature is set to 850° C. or lower, preferably set to 800° C. or lower and more preferably set to 750° C. or lower, it is possible to highly satisfy both appropriate toughness and a low iron loss and a high magnetic flux density.

The mechanism for the addition of Sn and Sb to contribute to a decrease in the iron loss and an increase in the magnetic flux density is considered that these elements suppress the growth of {111} orientation grains, which adversely affect the magnetic characteristics.

When pickling, cold rolling and final annealing are carried out by normal methods on the hot-rolled steel sheet for a non-oriented electrical steel sheet of the present invention, which is obtained as described above, it is possible to obtain a non-oriented electrical steel sheet having excellent magnetic characteristics. At this time, since the hot-rolled steel sheet for a non-oriented electrical steel sheet of the present invention has excellent toughness as described above, there are no cases where cracks are initiated due to bending and unbending even when pickling is carried out by a normal method. As described above, the hot-rolled steel sheet for a non-oriented electrical steel sheet according to the present invention undergoes the hot rolling process, the heat conservation treatment process and the cooling process. The cooling process may be carried out, for example, in the middle of the conveyance of the coil to a pickling device that is used in the pickling process, which is ahead of the cold rolling of the steel sheet, in the manufacturing method of a non-oriented electrical steel sheet.

In the present invention, the hot-rolled sheet toughness means the toughness of the steel sheet for a non-oriented electrical steel sheet before the pickling process that has undergone the cooling process after the above-described self-annealing.

EXAMPLES

Next, examples of the present invention will be described, but conditions in the examples are examples of conditions adopted to confirm the feasibility and effect of the present invention, and the present invention is not limited to these examples. The present invention is capable of adopting a variety of conditions within the scope of the gist of the present invention as long as the objective of the present invention is achieved.

Example 1

Steels having components shown in Table 1 were cast and hot-rolled, thereby producing hot-rolled sheets having a sheet thickness of 2.0 mm. After that, under conditions shown in Table 2, the hot-rolled sheets were coiled into coils, heat was retained, and the coils were cooled, thereby producing hot-rolled steel sheets for a non-oriented electrical steel sheet.

The cooling was carried out by spraying an air to the end portions. As the cooling rates, the cooling rates at the positions of the steel sheet end portions were measured using a radiation thermometer.

A manufacturing method sign B0 is a reference example in which the hot-rolled steel sheet was coiled, cooled and then hot-band annealed in a nitrogen 100% atmosphere. The measurement results of the C and P concentrations in the grain boundaries at the end portions of the produced hot-rolled steel sheets for a non-oriented electrical steel sheet and the transition temperatures in a Charpy test carried out to evaluate the toughness are shown in Table 3.

The C and P concentrations in the grain boundaries were measured by cutting Charpy test pieces from the sheet width-direction end portions of the steel sheets, making notches on the steel sheet side surface sides, carrying out the Charpy test in an atmosphere of −50° C. or lower and analyzing the intergranular fractured surfaces by Auger electron spectroscopy (AES).

The fractured surface transition temperatures were measured by carrying out a Charpy test according to JIS Z 2242. In the present examples, in a case where the fractured surface transition temperature was lower than 0° C., the toughness was determined to be favorable.

Next, the produced hot-rolled steel sheets for a non-oriented electrical steel sheet were pickled by being immersed in hydrochloric acid (85° C., 7.5 mass %) for 30 seconds, then, cold-rolled up to a thickness of 0.5 mm at a rolling reduction of 75% and final-annealed at 1050° C. for 30 seconds, thereby obtaining non-oriented electrical steel sheets.

In addition, the magnetic characteristics of the obtained non-oriented electrical steel sheets were measured according to JIS C 2556.

55 mm×55 mm specimens were collected from the non-oriented electrical steel sheets, W15/50's (the iron losses at the time of magnetizing the steel sheets to a magnetic flux density of 1.5 T at 50 Hz) were measured with a single sheet tester (SST), and the iron losses were evaluated. The magnetic flux densities were evaluated using B50's, which are magnetic flux densities at a magnetic field intensity of 5000 A/m. The measurement results are all shown in Table 3.

TABLE 1

| | Chemical components (mass %) (remainder is Fe and impurities) | | | | | | | | | | | | | | |
|---|---|---|---|---|---|---|---|---|---|---|---|---|---|---|---|
| Steel No. | C | Si | Mn | P | S | Al | N | B | Sn | Sb | Cu | REM | Ca | Mg | |
| A1 | 0.0011 | 3.21 | 0.21 | 0.05 | 0.003 | 1.18 | 0.0012 | 0.0013 | — | — | — | — | — | — | Invention Example |
| A2 | 0.0049 | 2.92 | 0.25 | 0.01 | 0.002 | 1.51 | 0.0023 | 0.0021 | — | — | — | — | — | — | |
| A3 | 0.0013 | 1.91 | 0.16 | 0.02 | 0.004 | 2.83 | 0.0021 | 0.0035 | — | — | — | — | — | — | |
| A4 | 0.0024 | 3.48 | 0.23 | 0.01 | 0.005 | 0.83 | 0.0016 | 0.0024 | — | — | — | — | — | — | |
| A5 | 0.0035 | 3.12 | 0.06 | 0.04 | 0.002 | 1.39 | 0.0013 | 0.0042 | — | — | — | — | — | — | |
| A6 | 0.0024 | 2.56 | 1.95 | 0.02 | 0.003 | 0.84 | 0.0026 | 0.0027 | — | — | — | — | — | — | |
| A7 | 0.0026 | 1.94 | 0.56 | 0.09 | 0.002 | 2.52 | 0.0023 | 0.0031 | — | — | — | — | — | — | |
| A8 | 0.0021 | 2.41 | 0.78 | 0.03 | 0.005 | 1.80 | 0.0021 | 0.0042 | — | — | — | — | — | — | |
| A9 | 0.0015 | 3.43 | 1.41 | 0.05 | 0.002 | 0.12 | 0.0031 | 0.0033 | — | — | — | — | — | — | |
| A10 | 0.0042 | 1.92 | 0.06 | 0.09 | 0.003 | 2.88 | 0.0024 | 0.0051 | — | — | — | — | — | — | |

TABLE 1-continued

| Steel No. | Chemical components (mass %) (remainder is Fe and impurities) | | | | | | | | | | | | | | |
|---|---|---|---|---|---|---|---|---|---|---|---|---|---|---|---|
| | C | Si | Mn | P | S | Al | N | B | Sn | Sb | Cu | REM | Ca | Mg | |
| A11 | 0.0013 | 2.38 | 1.52 | 0.03 | 0.002 | 1.35 | 0.0039 | 0.0024 | — | — | — | — | — | — | |
| A12 | 0.0032 | 2.87 | 0.28 | 0.04 | 0.003 | 1.56 | 0.0021 | 0.0058 | — | — | — | — | — | — | |
| A13 | 0.0045 | 2.95 | 0.37 | 0.03 | 0.001 | 1.40 | 0.0023 | 0.0023 | — | — | — | — | — | — | |
| A14 | 0.0036 | 3.11 | 0.26 | 0.05 | 0.003 | 1.27 | 0.0014 | 0.0034 | — | — | — | — | — | — | |
| A15 | 0.0021 | 3.21 | 0.23 | 0.01 | 0.002 | 1.17 | 0.0032 | 0.0023 | — | — | — | — | 0.0010 | — | |
| A16 | 0.0023 | 3.14 | 0.25 | 0.01 | 0.001 | 1.24 | 0.0015 | 0.0023 | — | — | — | — | — | 0.0020 | |
| A17 | 0.0012 | 3.02 | 0.33 | 0.04 | 0.002 | 1.34 | 0.0023 | 0.0021 | — | — | 0.34 | — | — | — | |
| A18 | 0.0013 | 2.95 | 0.66 | 0.02 | 0.001 | 1.21 | 0.0016 | 0.0034 | — | — | — | 0.0009 | — | — | |
| A19 | 0.0012 | 3.02 | 0.15 | 0.02 | 0.002 | 1.46 | 0.0017 | 0.0021 | 0.43 | — | — | — | — | — | |
| A20 | 0.0015 | 2.56 | 0.23 | 0.03 | 0.001 | 1.97 | 0.0016 | 0.0025 | — | 0.41 | — | — | — | — | |
| A21 | 0.0018 | 2.68 | 0.25 | 0.02 | 0.002 | 1.81 | 0.0023 | 0.0032 | 0.04 | — | 0.05 | — | — | — | |
| a1 | 0.0002 | 3.24 | 0.06 | 0.02 | 0.002 | 1.24 | 0.0013 | 0.0032 | — | — | — | — | — | — | Comparative |
| a2 | 0.0081 | 2.97 | 0.24 | 0.04 | 0.003 | 1.46 | 0.0024 | 0.0054 | — | — | — | — | — | — | Example |
| a3 | 0.0034 | 1.82 | 0.07 | 0.02 | 0.002 | 3.00 | 0.0031 | 0.0023 | — | — | — | — | — | — | |
| a4 | 0.0021 | 4.13 | 0.07 | 0.06 | 0.003 | 0.13 | 0.0025 | 0.0031 | — | — | — | — | — | — | |
| a5 | 0.0028 | 2.65 | 0.02 | 0.02 | 0.004 | 2.00 | 0.0025 | 0.0051 | — | — | — | — | — | — | |
| a6 | 0.0032 | 1.99 | 3.44 | 0.06 | 0.004 | 0.56 | 0.0031 | 0.0021 | — | — | — | — | — | — | |
| a7 | 0.0013 | 2.37 | 1.35 | 0.21 | 0.002 | 1.47 | 0.0034 | 0.0034 | — | 0.03 | — | — | — | — | |
| a8 | 0.0023 | 2.65 | 1.25 | 0.04 | 0.009 | 1.19 | 0.0032 | 0.0032 | 0.04 | — | — | — | — | — | |
| a9 | 0.0016 | 2.88 | 0.45 | 0.07 | 0.003 | 0.08 | 0.0021 | 0.0021 | — | — | 0.22 | — | — | — | |
| a10 | 0.0036 | 1.92 | 0.06 | 0.01 | 0.002 | 3.59 | 0.0011 | 0.0044 | — | 0.13 | 0.26 | — | — | — | |
| a11 | 0.0028 | 3.16 | 0.75 | 0.01 | 0.003 | 0.89 | 0.0081 | 0.0025 | 0.22 | 0.34 | — | — | — | — | |
| a12 | 0.0043 | 2.67 | 0.58 | 0.02 | 0.001 | 1.61 | 0.0034 | 0.0088 | 0.37 | 0.24 | 0.25 | — | — | — | |

TABLE 2

| Manufacturing method sign | Hot rolling process | | | Hot-band annealing | Heat conservation treatment process | | Average cooling rate | |
|---|---|---|---|---|---|---|---|---|
| | Slab heating temperature (° C.) | Finish temperature (° C.) | Coil coiling temperature (° C.) | process Annealing temperature (° C.) | Heat conservation temperature (° C.) | Heat conservation time (min) | Coiling temperature to 600° C. (° C./min) | 600° C. to 400° C. (° C./hr) |
| B0 | 1160 | 870 | 650 | 920 | — | — | — | — |
| B1 | 1082 | 890 | 760 | — | 750 | 65 | 50 | 58 |
| B2 | 1195 | 882 | 790 | — | 780 | 63 | 60 | 67 |
| B3 | 1123 | 852 | 819 | — | 790 | 28 | 90 | 76 |
| B4 | 1187 | 998 | 778 | — | 760 | 48 | 30 | 38 |
| B5 | 1165 | 920 | 768 | — | 740 | 2 | 30 | 56 |
| B6 | 1189 | 870 | 813 | — | 800 | 118 | 40 | 84 |
| B7 | 1154 | 890 | 780 | — | 760 | 28 | 70 | 35 |
| B8 | 1176 | 928 | 797 | — | 780 | 47 | 60 | 118 |
| B9 | 1143 | 932 | 780 | — | 750 | 114 | 30 | 50 |
| B10 | 1128 | 890 | 782 | — | 740 | 39 | 50 | 112 |
| b1 | 970 | 904 | 778 | — | 790 | 45 | 30 | 45 |
| b2 | 1423 | 936 | 739 | — | 780 | 109 | 90 | 79 |
| b3 | 1165 | 801 | 728 | — | 750 | 46 | 30 | 86 |
| b4 | 1187 | 1180 | 716 | — | 740 | 29 | 40 | 98 |
| b5 | 1165 | 890 | 729 | — | 760 | 0.5 | 50 | 55 |
| b6 | 1165 | 920 | 726 | — | 730 | 200 | 20 | 102 |
| b7 | 1181 | 930 | 709 | — | 720 | 114 | 30 | 12 |
| b8 | 1174 | 890 | 729 | — | 740 | 93 | 70 | 198 |
| b9 | 1165 | 890 | 780 | — | 740 | 65 | 110 | 80 |
| b10 | 1156 | 920 | 770 | — | 800 | 70 | 5 | 90 |
| b11 | 1176 | 900 | 760 | — | 680 | 70 | 30 | 80 |
| b12 | 1156 | 880 | 780 | — | 900 | 65 | 20 | 90 |
| b13 | 1156 | 890 | 770 | — | 720 | 45 | 30 | 20 |

TABLE 3

| Sign | Steel No. | Manufacturing method No. | TR = C/P | Hot-rolled sheet toughness Charpy transition temperature (° C.) | Magnetic flux density B50 (T) | Iron loss W15/50 (W/kg) |
|---|---|---|---|---|---|---|
| C0 | A1 | B0 | 1.2 | 28 | | |
| C1 | A1 | B1 | 4.2 | −4 | 1.68 | 2.51 |
| C2 | A2 | B2 | 4.5 | −3 | 1.68 | 2.56 |
| C3 | A3 | B3 | 5.3 | −4 | 1.71 | 2.54 |

TABLE 3-continued

| Sign | Steel No. | Manufacturing method No. | TR = C/P | Hot-rolled sheet toughness Charpy transition temperature (° C.) | Magnetic flux density B50 (T) | Iron loss W15/50 (W/kg) |
|---|---|---|---|---|---|---|
| C4 | A4 | B4 | 5.6 | −10 | 1.68 | 2.58 |
| C5 | A5 | B5 | 4.2 | −10 | 1.68 | 2.55 |
| C6 | A6 | B6 | 3.7 | −6 | 1.68 | 2.57 |
| C7 | A7 | B7 | 5.5 | −8 | 1.65 | 2.55 |
| C8 | A8 | B8 | 3.7 | −2 | 1.65 | 2.54 |
| C9 | A9 | B9 | 3.5 | −7 | 1.66 | 2.54 |
| C10 | A10 | B10 | 4.8 | −9 | 1.67 | 2.59 |
| C11 | A11 | B1 | 4.2 | −10 | 1.67 | 2.54 |
| C12 | A12 | B2 | 5.1 | −11 | 1.69 | 2.52 |
| C13 | A13 | B7 | 5.6 | −9 | 1.71 | 2.51 |
| C14 | A14 | B8 | 6.3 | −8 | 1.72 | 2.52 |
| c1 | a1 | b1 | 2.8 | 13 | 1.61 | 2.63 |
| c2 | a2 | b2 | 2.7 | 14 | 1.61 | 2.68 |
| c3 | a3 | b3 | 1.3 | 13 | 1.58 | 2.65 |
| c4 | a4 | b4 | 1.5 | 15 | 1.58 | 2.64 |
| c5 | a5 | b5 | 1.6 | 17 | 1.59 | 2.67 |
| c6 | a6 | b6 | 1.5 | 9 | 1.55 | 2.66 |
| c7 | a7 | b7 | 1.4 | 8 | 1.54 | 2.65 |
| c8 | a8 | b8 | 1.3 | 7 | 1.55 | 2.64 |
| c9 | a9 | b1 | 1.8 | 9 | 1.54 | 2.65 |
| c10 | a10 | b2 | 1.8 | 9 | 1.57 | 2.69 |
| c11 | a11 | b3 | 2.1 | 8 | 1.56 | 2.69 |
| c12 | a12 | b4 | 2.1 | 15 | 1.59 | 2.64 |
| c13 | A1 | b5 | 2.8 | 9 | 1.62 | 2.62 |
| c14 | A2 | b6 | 2.9 | 8 | 1.59 | 2.63 |
| c15 | A3 | b7 | 2.7 | 7 | 1.59 | 2.64 |
| c16 | A4 | b8 | 2.8 | 9 | 1.58 | 2.63 |
| c17 | A4 | b9 | 2.5 | 5 | 1.56 | 2.62 |
| c18 | A5 | b10 | 2.4 | 6 | 1.58 | 2.67 |
| c19 | A6 | b11 | 2.4 | 7 | 1.57 | 2.64 |
| c20 | A7 | b12 | 2.6 | 2 | 1.56 | 2.66 |
| c21 | A8 | b13 | 2.1 | 8 | 1.59 | 2.67 |
| c22 | a1 | B1 | 1.2 | 5 | 1.56 | 2.63 |
| c23 | a2 | B2 | 1.6 | 3 | 1.57 | 2.64 |
| c24 | a3 | B3 | 1.2 | 4 | 1.58 | 2.63 |
| c25 | a4 | B4 | 2.5 | 6 | 1.58 | 2.64 |
| c26 | a5 | B5 | 1.2 | 7 | 1.58 | 2.64 |

Example 2

Hot-rolled steel sheets for a non-oriented electrical steel sheet were produced in the same manner using steels shown in Table 1 and manufacturing methods shown in Table 2, and then non-oriented electrical steel sheets were obtained.

Regarding the obtained hot-rolled steel sheets for a non-oriented electrical steel sheet, in addition to the measurement results of Example 1, the ratios between the grain boundary C concentration and the intragranular C concentration were measured. Regarding the non-oriented electrical steel sheets, the magnetic characteristics were measured in the same manner as in Example 1. The results are shown in Table 4.

TABLE 4

| Sign | Steel No. | Manufacturing method No. | TR = C/P | CR = $C_{GB}/C_{IG}$ | Hot-rolled sheet toughness Charpy transition temperature (° C.) | Magnetic flux density B50 (T) | Iron loss W15/50 (W/kg) | |
|---|---|---|---|---|---|---|---|---|
| D1 | A1 | B4 | 4.2 | 3.2 | −4 | 1.68 | 2.51 | Comparative Example |
| D2 | A2 | B6 | 4.5 | 3.1 | −3 | 1.68 | 2.56 | Comparative Example |
| D3 | A13 | B9 | 5.6 | 5.2 | −19 | 1.71 | 2.51 | Invention Example |
| D4 | A14 | B2 | 6.3 | 6.1 | −18 | 1.72 | 2.52 | Invention Example |
| D5 | a1 | b1 | 2.8 | 3.1 | 13 | 1.61 | 2.63 | Comparative Example |
| D6 | A2 | b6 | 2.9 | 3.2 | 8 | 1.59 | 2.63 | Comparative Example |
| D7 | a1 | B1 | 1.2 | 3.1 | 5 | 1.56 | 2.63 | Comparative Example |

It was possible to confirm that, when the ratio $CR=C_{GB}/C_{IG}$ of the C concentration $C_{GB}$ [atom %] present in the grain boundaries to the C concentration $C_{IG}$ [atom %] present in the grains was set to 3.5 or more, superior characteristics were obtained. While not explicitly shown in Table 3, CR's were 3.5 or more in C1, C2, C3, C5, C9, C11 and C12.

It was possible to confirm that the use of the hot-rolled steel sheet for a non-oriented electrical steel sheet of the present invention makes it possible to obtain a non-oriented electrical steel sheet having as excellent characteristics as non-oriented electrical steel sheets for which a conventional hot-rolled steel sheet for a non-oriented electrical steel sheet that had undergone hot-band annealing was used without causing the fracturing of the steel sheet during pickling.

INDUSTRIAL APPLICABILITY

According to the present invention, it is possible to provide a hot-rolled steel sheet for a non-oriented electrical steel sheet having sufficient hot-rolled sheet toughness even in the case of skipping annealing in a hot rolling process and satisfying both a low iron loss and a high magnetic flux density when a non-oriented electrical steel sheet is produced. Therefore, it is possible to stably produce and provide a non-oriented electrical steel sheet having a low iron loss and a high magnetic flux density without causing fracturing, and thus the present invention is capable of sufficiently meeting an urgent demand for mass production in the field of electrical equipment for which the non-oriented electrical steel sheet is used as an iron core material and has an extremely high industrial value.

What is claimed is:

1. A hot-rolled steel sheet for a non-oriented electrical steel sheet comprising, in mass %:

C: 0.0010% to 0.0050%;
Si: 1.90% to 3.50%;
Al: 0.10% to 3.00%;
Mn: 0.05% to 2.00%;
P: 0.10% or less;
S: 0.005% or less;
N: 0.0040% or less;
B: 0.0060% or less;
Sn: 0% to 0.50%;
Sb: 0% to 0.50%;
Cu: 0% to 0.50%;
REM: 0% to 0.0400%;
Ca: 0% to 0.0400%;
Mg: 0% to 0.0400%, and
a remainder consisting of Fe and impurities,
wherein, in a sheet width-direction end portion of the hot-rolled steel sheet for a non-oriented electrical steel sheet, a C concentration [atom %] in a crystal grain boundary is 3.0 or more times a P concentration [atom %] in the crystal grain boundary, and
the C concentration [atom %] in the crystal grain boundary of the hot-rolled steel sheet for a non-oriented electrical steel sheet is 3.5 or more times a C concentration in a crystal grain.

2. The hot-rolled steel sheet for a non-oriented electrical steel sheet according to claim 1, comprising, in mass %, at least one of:

Sn: 0.01% or more and 0.50% or less;
Sb: 0.01% or more and 0.50% or less;
Cu: 0.01% or more and 0.50% or less;
REM: 0.0005% or more and 0.0400% or less;
Ca: 0.0005% or more and 0.0400% or less; and
Mg: 0.0005% or more and 0.0400% or less.

3. A hot-rolled steel sheet for a non-oriented electrical steel sheet comprising, in mass %:

C: 0.0010% to 0.0050%;
Si: 1.90% to 3.50%;
Al: 0.10% to 3.00%;
Mn: 0.05% to 2.00%;
P: 0.10% or less;
S: 0.005% or less;
N: 0.0040% or less;
B: 0.0060% or less;
Sn: 0% to 0.50%;
Sb: 0% to 0.50%;
Cu: 0% to 0.50%;
REM: 0% to 0.0400%;
Ca: 0% to 0.0400%;
Mg: 0% to 0.0400%, and
a remainder comprising Fe and impurities,
wherein, in a sheet width-direction end portion of the hot-rolled steel sheet for a non-oriented electrical steel sheet, a C concentration [atom %] in a crystal grain boundary is 3.0 or more times a P concentration [atom %] in the crystal grain boundary, and
the C concentration [atom %] in the crystal grain boundary of the hot-rolled steel sheet for a non-oriented electrical steel sheet is 3.5 or more times a C concentration in a crystal grain.

4. The hot-rolled steel sheet for a non-oriented electrical steel sheet according to claim 1, comprising, in mass %:

N: 0.0005 to 0.0040%.

5. The hot-rolled steel sheet for a non-oriented electrical steel sheet according to claim 1, comprising, in mass %:

Sn: 0.04 to 0.50%.

* * * * *